3,537,297
VENTING OF UNDESIRED COMPONENTS IN CHROMATOGRAPHIC ANALYZER
Robert J. Loyd, Pittsburgh, Pa., and Buell O. Ayers, Bartlesville, Okla., assignors to Phillips Petroleum Company, a corporation of Delaware
Continuation of application Ser. No. 736,300, May 19, 1958, which is a continuation-in-part of application Ser. No. 678,699, Aug. 16, 1957. This application Dec. 9, 1963, Ser. No. 329,189
Int. Cl. G01n 31/08
U.S. Cl. 73—23.1      7 Claims

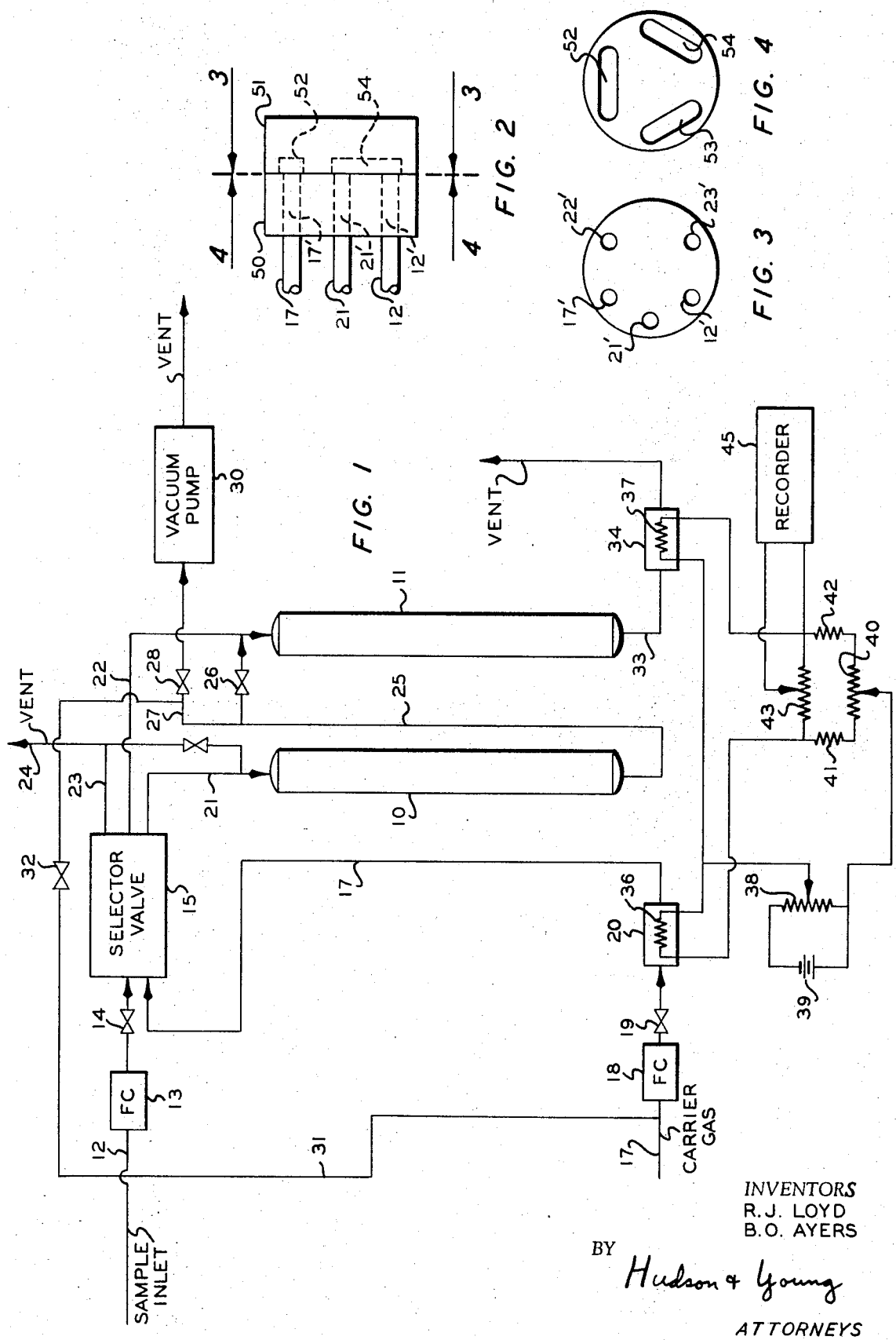

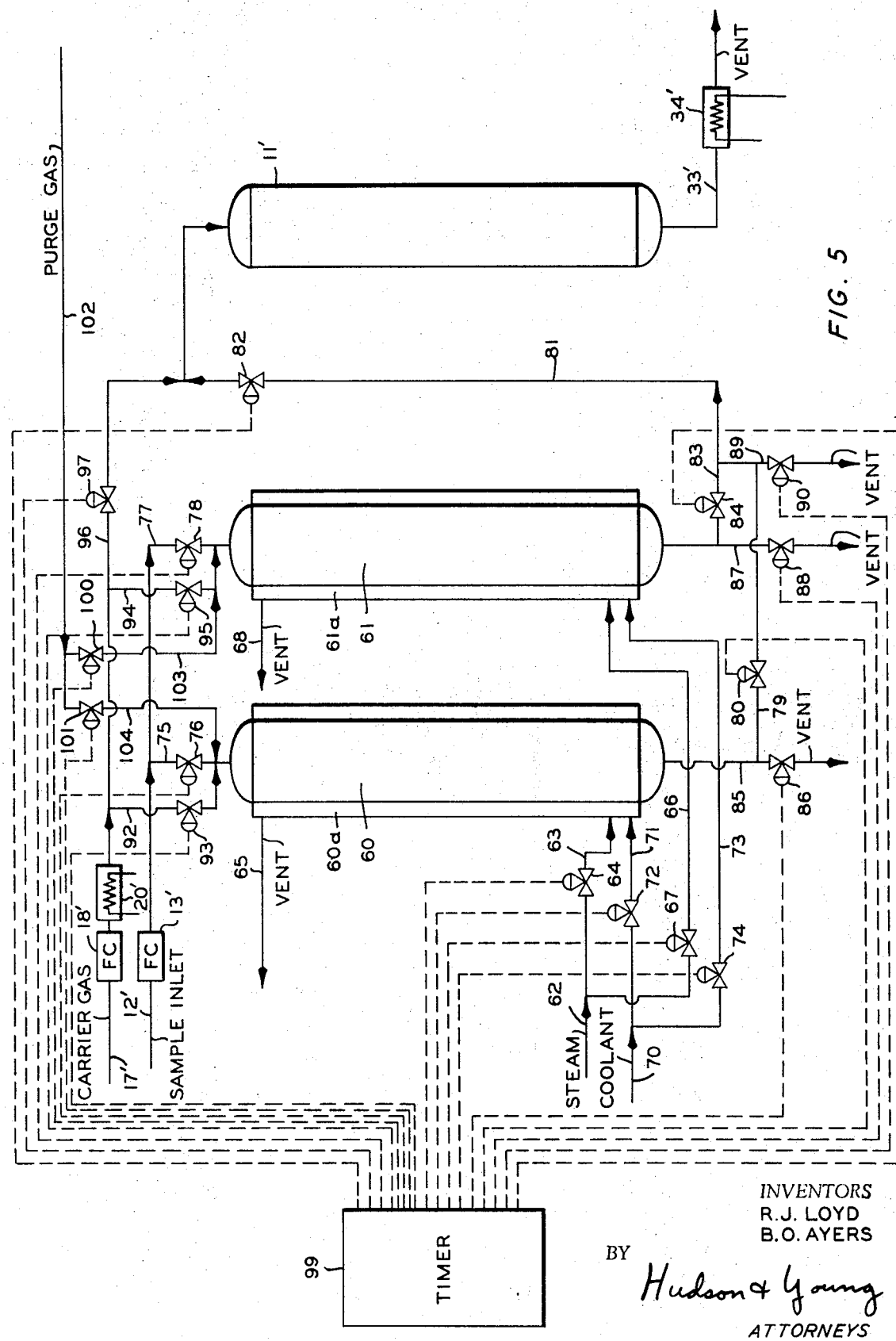

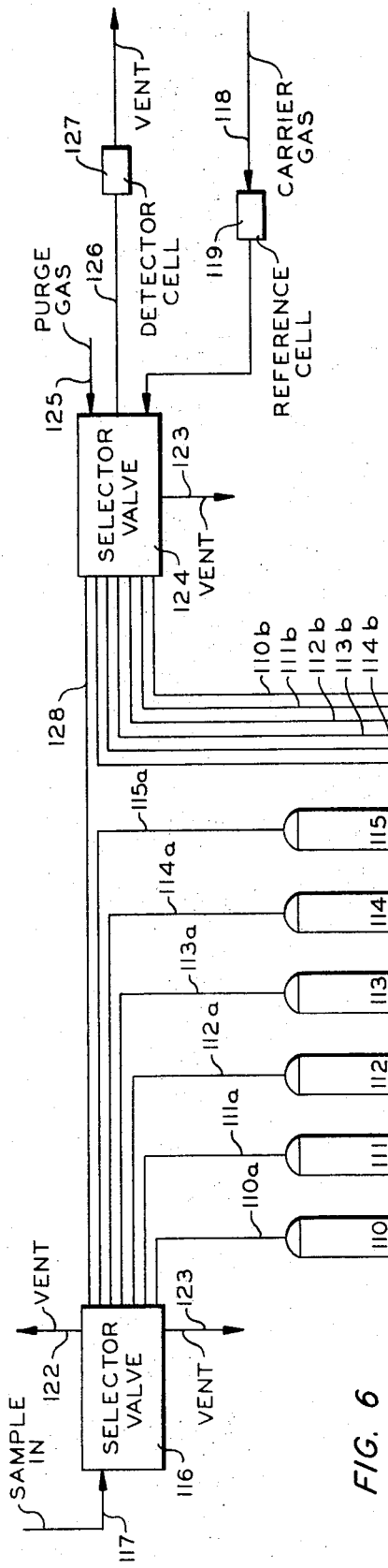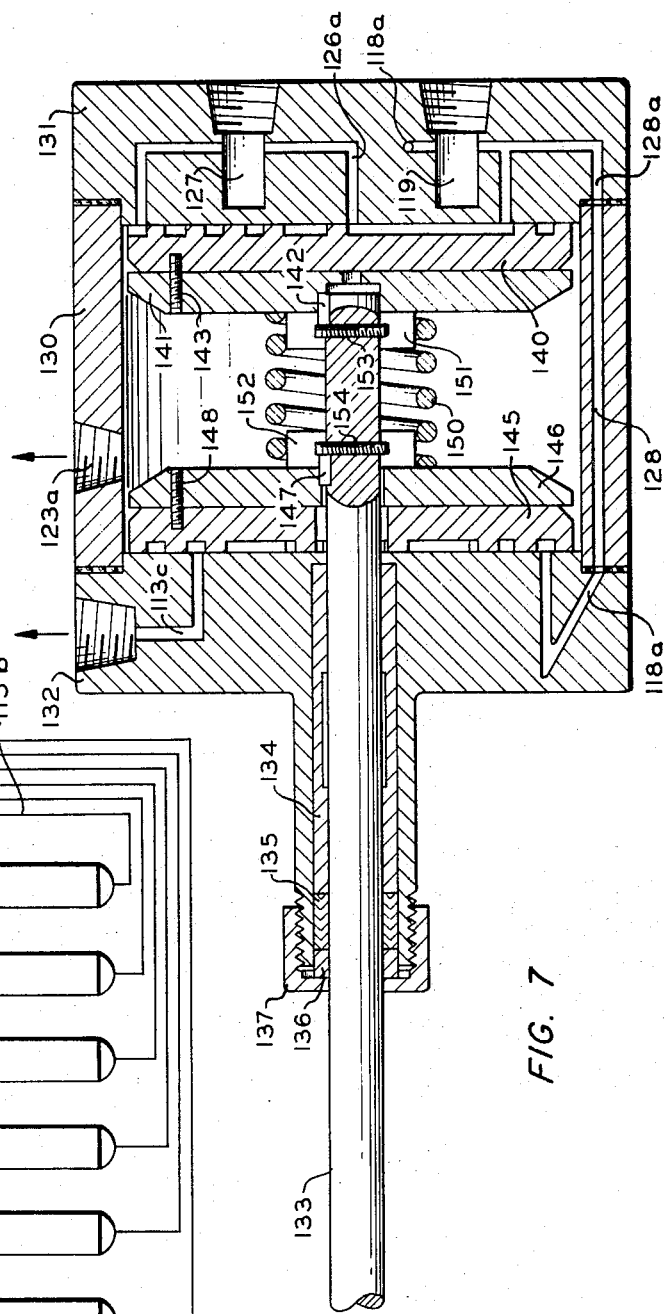
FIG. 6
FIG. 7
INVENTORS
R.J. LOYD
B.O. AYERS
BY *Hudson & Young*
ATTORNEYS INVENTORS
R.J. LOYD
B.O. AYERS
BY
*Hudson & Young*
ATTORNEYS

United States Patent Office 3,537,297
Patented Nov. 3, 1970

ABSTRACT OF THE DISCLOSURE

In a chromatographic analysis system undesired components eluting from a column are passed to a vent while the components of interest are forwarded to a measuring device. The flow of carrier gas through the measuring cell can be maintained by another route while the effluent from the column is being vented.

This invention relates to the analysis of fluid streams to detect constituents present in relatively small concentrations.

This application is a continuation of copending application Ser. No. 736,000, filed May 19, 1958, now abandoned, which in turn is a continuation-in-part of application Ser. No. 678,699, filed Aug. 16, 1957, now abandoned.

In various industrial and laboratory operations, there is a need for analysis procedures which are capable of measuring small concentrations of constituents in fluid mixtures. One analysis procedure which presently is becoming quite valuable for fluid analysis involves elution chromatography. In elution chromatography, a sample of the material to be separated is introduced into a column which contains a selective sorbent. A carrier gas is directed into the column so as to force the sample material through the column. The sorbent attempts to hold the constituents of the sample, whereas the stripping gas tends to pull them through the column. This results in the several constituents of the fluid mixture traveling through the column at different rates of speed, depending upon their affinities for the packing material. The column effluent thus consists initially of the carrier gas alone; the individual constituents of the fluid mixture then appear at spaced time intervals. It is common practice to detect these constituents by means of a thermal conductivity analyzer which compares the thermal conductivity of the effluent gas with the thermal conductivity of the carrier gas directed to the column.

While analyzers of this type have proved to be quite valuable in the analysis of fluid mixtures, it has been found that the thermal conductivity cells do not have sufficient sensitivity to detect constituents which often are present in the sample gas in extremely small concentrations. In accordance with the present invention, an improved chromatographic analyzer is provided which is capable of detecting constituents in extremely small concentrations. Either two separate chromatographic columns or a single column having two zones is employed. A relatively large volume of the gas sample is passed initially to the first zone so that a substantial portion of the first zone is saturated with the gas sample. A carrier gas is then directed through this first zone, and the effluent therefrom forms the sample gas for the second zone which is operated as a conventional elution chromatographic analyzer. In this manner, constituents which are present in the initial gas sample in small concentrations are concentrated in a relatively small volume of carrier gas to form the sample to the second zone.

Accordingly, it is an object of this invention to provide an analyzer which is capable of detecting extremely small concentrations of constituents in fluid mixtures.

Another object is to provide an improved chromatographic analyzer.

A further object is to provide an analyzer which is capable of detecting small concentrations of carbon monoxide in gaseous streams.

Other objects, advantages and features of the invention should become apparent from the following detailed description which is taken in conjunction with the accompanying drawings in which:

FIG. 1 is a schematic representation of a first embodiment of the analyzer of this invention.

FIG. 2 is a schematic view of the selector value employed in the analyzer of FIG. 1.

FIG. 3 is a view taken along line 3—3 in FIG. 2.

FIG. 4 is a view taken along line 4—4 in FIG. 2.

FIG. 5 is a schematic representation of a second embodiment of the analyzer of this invention.

FIG. 6 is a schematic representation of a third embodiment of the analyzer of this invention.

FIG. 7 is a view, shown partly in section, of the selector valves employed in the analyzer of FIG. 6.

Figures 8A, 8B, 8C:
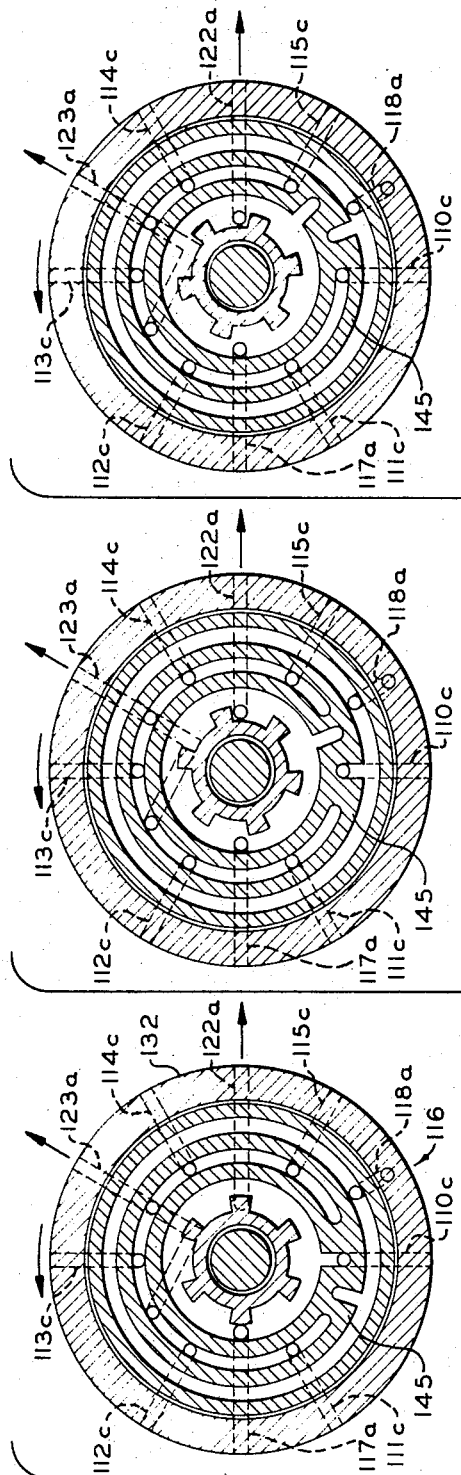
FIGS. 8a, 8b and 8c illustrate sequential positions of the selector valves of FIG. 7.

Referring now to the drawing in detail and to FIG. 1 in particular, there are shown two columns 10 and 11 which are filled with packing materials. A gas sample to be analyzed is introduced into the system through a conduit 12 which has a flow controller 13 and a valve 14, which can be a pressure regulating valve, therein. Conduit 12 communicates with one inlet of a selector valve 15. A carrier gas is introduced into the system through a conduit 17 which has a flow controller 18, a valve 19 and a thermal conductivity cell 20 therein. Valve 19 can also be a pressure regulating valve. Conduit 17 communicates with a second inlet of selector valve 15. The first outlet of selector valve 15 is connected by a conduit 21 to the inlet of column 10. A second outlet of selector valve 15 is connected by a conduit 22 to the inlet of column 11. The third outlet of selector valve 15 is connected by a conduit 23 to a vent conduit 24.

The outlet of column 10 is connected by a conduit 25, which has a valve 26 therein, to the inlet of column 11. A conduit 27, having a valve 28 therein, communicates between conduit 25 upstream from valve 26 and the inlet of a vacuum pump 30. A conduit 31, having a valve 32 therein, communicates between conduit 17 and conduit 27 upstream from valve 28. A vent conduit 33, which has a second thermal conductivity cell 34 therein, communicates with the outlet of column 11.

Thermal conductivity cells 20 and 34 have respective thermistors 36 and 37 therein which are in thermal contact with the gases flowing through respective conduits 17 and 33. The first terminals of thermistors 36 and 37 are connected to one another and to the contactor of a potentiometer 38. A voltage source 39 is connected across the end terminals of potentiometer 38. One end terminal of potentiometer 38 is connected to the contactor of a potentiometer 40. The first end terminal of potentiometer 40 is connected through a resistor 41 to the second terminal of thermistor 36. The second end terminal of potentiometer 40 is connected through a resistor 42 to the second terminal of thermistor 37. The end terminals of a potentiometer 43 are connected to the respective second terminals of thermistors 36 and 37. The contactor and one end terminal of potentiometer 43 are connected to the respective input terminals of a recorder 45.

It should be evident that thermistors 36 and 37 and the circuit elements associated therewith form a modified Wheatstone bridge network such that the signal applied to recorder 45 is representative of the difference in the thermal conductivities of the gases in contact with respective thermistors 36 and 37. Recorder 45 thus provides a signal which indicates differences in composition of the gases flowing through conduits 17 and 33.

Selector valve 15 is illustrated schematically in FIGS. 2, 3 and 4. This valve comprises a first block 50 which has openings 17′, 21′, 12′, 23′ and 22′ therein which are connected to respective conduits 17, 21, 12, 23, and 22 of FIG. 2. A second block 51 is mounted adjacent block 50. Block 51 is provided with three slots 52, 53, and 54 in the face thereof adjacent block 50. Block 51 is adapted to be rotated with respect to block 50 so that adjacent openings in block 50 can communicate with one another. In the illustrated portion, openings 17′ and 22′ communicate with one another through slot 52, and openings 21′ and 12′ communicate with one another through slot 54.

In order to describe the operation of the analyzer of this invention, reference will be made to a particular detection of carbon monoxide in a fluid mixture containing ethylene, hydrogen, nitrogen, methane, ethane and acetylene. The carbon moxoxide normally is present in concentrations of approximately 0 to 50 parts per million. Hydrogen, nitrogen, methane and ethane are present in relatively small concentrations in comparison to the ethylene. Columns 10 and 11 are each approximately 6 feet long and have internal diameters of approximately ¼ inch. Column 10 is filled with a molecular sieve material comprising a dehydrated zeolite. This material is in the form of cylindrical particles approximately 1/16 inch in diameter and approximately 1/8 inch long. Column 11 is filled with particles of activated coconut charcoal of approximately 20 to 30 mesh. Helium is employed as the carrier gas and is supplied through conduit 17 at a rate of approximately 30 cubic centimeters per minute. Columns 10 and 11 are maintained at approximately 50° C.

Columns 10 and 11 initially are purged by directing the carrier gas therethrough. This is accomplished by opening the valve 19 and closing valve 32. Block 51 of the selector valve is rotated clockwise 60° from the position shown in FIG. 4 so that conduits 17 and 21 communicate with one another. Block 51 is then rotated back to the position illustarted in FIG. 4 so that the carrier gas bypasses column 10 and flows into column 11. Valve 14 is then opened so that the sample gas flows into column 10 through conduit 21. Valve 14 is opened for a length of time such that approximately 800 cubic centimeters of the sample gas is passed into column 10. This entire amount of sample gas is adsorbed by the packing material in column 10.

Block 51 is again rotated clockwise 60° from the position shown in FIG. 4. This results in a carrier gas again passing through column 10. The carbon monoxide in the gas sample is less strongly adsorbed by the materials in column 10 than are the hydrocarbons heavier than methane. Methane is less strongly adsorbed in column 10 than is carbon monoxide. The effluent from column 10 is carried into column 11 by the carrier gas. After a predetermined interval, approximately four minutes, block 51 is rotated back to the position illustrated in FIG. 4 so that the carrier gas is passed directly into column 11. Column 11 then operates a conventional elution chromatographic analyzer. The constitutents present in the feed sample to column 11 appear in succession in the effluent therefrom. Methane is more strongly retarded than is carbon monoxide in column 11. Thus, in the final analysis, carbon monoxide appears ahead of methane in the effluent from column 11. In a single molecular sieve column, this order is reversed, and methane would cover up the carbon monoxide if only a single column were present. During the time that column 11 is separating the constituents in this sample, column 10 can be purged by means of vacuum pump 30. The gas sample is vented continuously through conduit 24 so that a fresh sample is available at all times for subsequent analyses. Conduit 31 permits column 10 to be filled with carrier gas when vacuum pump 30 is turned off.

A second embodiment of the analyzer of this invention is illustrated schematically in FIG. 5 wherein elements corresponding to elements of FIG. 1 are designated by like primed reference numerals. Two adsorption columns 60 and 61 are provided in place of the single column 10 in FIG. 1. Columns 60 and 61 are provided with respective jackets 60a and 61a through which a heating material and a coolant can be circulated. A conduit 62 supplies steam or other heating material to the system. A conduit 63, having a valve 64 therein, communicates between conduit 62 and the inlet of jacket 60a. A vent conduit 65 communicates with the outlet of jacket 60a. A conduit 66, having a valve 7 therein, communicates between conduit 62 and the inlet of jacket 61a. A vent conduit 68 communicates with the outlet of jacket 61a. A coolant is also supplied to the system by means of a conduit 70. A conduit 71, having a valve 72 therein, communicates between conduit 70 and the inlet of jacket 60a. A conduit 73, having a valve 74 therein, communicates between conduit 70 and the inlet of jacket 61a.

A conduit 75, having a valve 76 therein, communicates between sample inlet conduit 12 and the inlet of column 60. A conduit 77, having a valve 78 therein, communicates between conduit 12′ and the inlet of column 61. The outlet of column 60 is connected by a conduit 79, which has a valve 80 therein, and a conduit 81, which has a valve 82 therein, to the inlet of column 11′. The outlet of column 61 is connected by a conduit 83, which has a valve 84 therein, to conduit 81. A vent conduit 85, having a valve 86 therein, communicates with the outlet of column 60. A vent conduit 87, having a valve 88 therein, communicates with the outlet of column 61. A vent conduit 89, having a valve 90 therein, communicates with conduit 81. A conduit 92, having a valve 93 therein, communicates between carrier gas supply conduit 17′ and the inlet of column 60. A conduit 94, having a valve 95 therein, communicates between conduit 17′ and the inlet of column 61. A conduit 96, having a valve 97 therein, communicates between conduit 17′ and the inlet of column 11′. A purge gas, which can be the carrier gas, is introduced into the system through a conduit 102. A conduit 103, having a valve 100 therein, communicates between conduit 102 and the inlet of column 61. A conduit 104, having a valve 101 therein, communicates between conduit 102 and the inlet of column 60.

Valves 64, 72, 67, 74, 86, 80, 88, 90, 84, 93, 76, 95, 78, 97, 100 and 101 are operated either manually or in the sequence described hereinabove by means of a timer 99. Timer 99 can comprise a plurality of cams which are rotated by a constant speed motor. These cams open and close the valve by opening and closing respective switches which control the application of electrical energy or pneumatic pressure, for example, to the control valves, depending upon the form of the valves.

At the beginning of the analysis cycle, valves 76, 80 and 90 are opened so that the sample from conduit 12′ flows through column 60. Valve 97 is opened so that the carrier gas flows through column 11′. Valves 100 and 88 are opened so that the purge gas flows through column 61 so as to purge this column from any material adsorbed therein. Valve 72 is opened so that coolant flows through jacket 60a because the constituents of the sample material are more readily adsorbed in column 60 when the column is cooled. Valve 67 is opened so that steam flows through jacket 61a to facilitate desorption of any gas constituents within column 61.

At the end of a predetermined time, valves 93, 80 and 82 are opened and valves 90 and 97 are closed so that the carrier gas flows through column 60 to sweep the trace components of the sample into analyzer column 11′. Valves 100 and 88 remain open so that purge gas continues to flow through column 61. Valves 72 and 74 are both opened so that coolant flows through jackets 60a and 61a.

At the end of a second predetermined time, valves 101 and 86 are opened so that the purge gas purges column 60. Valves 100 and 88 remain open so that purge gas flows through column 61. At this time, valve 64 is opened so that steam is circulated through jacket 60a to facilitate desorption of the material in column 60. Valve 74 is opened so that coolant circulates through jacket 61a.

At the end of a third predetermined time, the above described cycle is repeated with the roles of columns 60 and 61 reversed. It should thus be evident that one of the columns is purged at the time the other is operated so that analyses can be carried out at a faster rate. The circulation of heating material and coolant through the jackets surrounding columns 60 and 61 increases the rates of desorption and adsorption. The overall operation of the analyzer of FIG. 5 is otherwise generally the same as the operation of the analyzer of FIG. 1.

In FIG. 6 there is shown a third embodiment of the analyzer of this invention wherein the two zones are contained in a single column. This is accomplished by positioning two separate materials in each of a plurality of columns 110, 111, 112, 113, 114 and 115. The inlet regions of these columns preferably contain an adsorption type of packing material such as a molecular sieve material comprising a dehydrated zeolite, silica gel, alumina or charcoal. The outlet regions of these columns normally contain a partition material such as a crushed inert solid coated by a solvent such as hexadecane or benzyl ether. However, in the particular carbon monoxide analysis previously described, the inlet region of each column is filled with zeolite and the outlet region is filled with charcoal. This is due to the fact that methane is more readily absorbed by the charcoal than is the carbon monoxide, whereas carbon monoxide is more readily absorbed by the zeolite.

The inlet ports of columns 110 to 115 are connected by respective conduits 110a, 111a, 112a, 113a, 114a and 115a to respective outlets of a selector valve 116. The fluid sample to be analyzed is introduced into an inlet port of selector valve 116 through a conduit 117. A flow controller and a pressure regulator, not shown, can be contained in conduit 117. A vent conduit 122 communicates with an outlet port of selector valve 116. The outlet ports of columns 110 to 115 are connected by respective conduits 110b, 111b, 112b, 113b, 114b and 115b to respective ports of a second selector valve 124. A carrier gas in introduced into a port of valve 124 through a conduit 118 which has a reference analyzer cell 119 disposed therein. Conduit 118 can also have a flow controller and a pressure regulator contained therein. Reference cell 119 preferably is a thermal conductivity cell which comprises a thermistor disposed in thermal contact with the carrier gas. A purge gas, which can be the same as the carrier gas, is introduced into selector valve 124 through a conduit 125. The outlet of selector valve 124 communicates with a conduit 126 which has a second detector cell 127 disposed therein. A conduit 128 communicates directly between selector valves 116 and 124. Cells 119 and 127 are connected into a detecting circuit of the form shown in FIG. 1.

In order to describe the operation of this third embodiment of the analyzer, reference is again made to an analysis of a fluid mixture comprising ethylene, methane and carbon monoxide in order to determine the concentration of carbon monoxide. Columns 110 to 115 contain 16/20 mesh molecular sieve material comprising a dehydrated zeolite in approximately the first 9 feet of the columns which are 15 feet long and have internal diameters of approximately ¼ inch. The last six feet of the columns contain 60/80 mesh activated charcoal. A carrier gas, helium, is introduced into the system through conduit 118 at a rate of approximately 30 cubic centimeters per minute.

The purge gas, also helium, is introduced into the system through conduit 125 at a rate of approximately 500 cubic centimeters per minute. The fluid mixture to be analyzed is introduced into the system through conduit 117 at a rate of approximately 100 cubic centimeters per minute. The columns are maintained at 50° C.

At a first point in the analyzer cycle, it is assumed that column 110 has been purged for a period in excess of two and one-half hours by the passage of purge gas therethrough from conduit 125. It is also assumed that this purge gas is flowing through columns 111 to 115 and is being vented from the system through conduit 123. Selector valve 116 is positioned initially so that carrier gas from conduit 118 flows through cell 119 and is vented through conduit 126. Sample inlet conduit 117 communicates with conduit 110a to introduce the sample mixture into column 110. This portion of the cycle continues for approximately eight minutes, which results in approximately one-half of the molecular sieve portion of the packing material in column 110 being saturated by the sample mixture and the beginning of a frontal type analysis as the ethylene tends to push the trace constituents ahead of it. Selector valves 116 and 124 are then actuated so that the sample mixture is vented through conduit 122 and the carrier gas from conduit 118 is introduced into column 110 through conduits 128 and 110a. Conduit 110b is connected through selector valve 124 to outlet conduit 126. This portion of the cycle continues for approximately five minutes, during which time the carrier gas elutes the carbon monoxide from the charcoal in column 110 because carbon monoxide is less readily adsorbed than the methane. The difference in thermal conductivity between the effluent gas and the carrier gas introduced into the system at this time represents the concentration of carbon monoxide in the sample being analyzed. At the end of this 5 minute period, the selector valves are actuated so that the carrier gas once again bypasses the column by being passed directly through detector 127 to vent. A portion of the purge gas is directed into column 110 from conduit 110b. This continues for 17 minutes, after which time the selector valves are again actuated so that the sample is introduced into column 111 and the flow of purge gas through column 111 is terminated. The above described cycle then repeats for column 111 and for each additional column in sequence, the total cycle requiring approximately three hours. Thus, during a three hour period, six complete analyses of the sample material are made.

Selector valves 116 and 124 are illustrated in FIGS. 7, 8a, 8b and 8c. With reference to FIG. 7, the selector valves comprise a cyclindrical housing 130 which is provided with respective end plates 131 and 132 that are secured thereto by suitable bolts or screws, not shown. Cells 119 and 127 are disposed in end plate 131. A rotatable shaft 133 extends into housing 130 and is supported by means of a sleeve 134 which is carried by end plate 132. Shaft 133 is sealed within end plate 132 by means of packing material 135 which is held in place by a sleeve 136 that is attached to plate 132 by a cap 137. A first valve plate 140 is attached to shaft 133 to rotate therewith by means of a backing plate 141 which is secured to shaft 133 by a key 142. A pin 143 secures plate 140 to plate 141 so that the two plates rotate together when shaft 133 is rotated. Plate 141 is free to move longitudinally of shaft 133. A second valve plate 145 is secured to shaft 133 by means of a backing plate 146 which is attached to shaft 133 by a key 147. A pin 148 extends between plates 145 and 146. Backing plate 146 is also free to move longitudinally of shaft 133. A compression spring 150 is disposed between backing plates 141 and 146 so as to retain plates 140 and 145 in engagement with respective end plates 131 and 132. Spring 150 is retained in position by means of disks 151 and 152 which are attached to shaft 133 by respective pins 153 and 154. Rotation of shaft 133 thus rotates valve plates 140 and 145.

A plurality of passages are drilled in end plates 131 and 132 for the introduction and withdrawal of fluids. These passages terminate adjacent respective valve plates 140 and 145 which are provided with recesses in the faces thereof to permit selected passages to communicate with one another. These passages and recesses are illustrated in FIGS. 8a, 8b, and 8c. With reference to the upper portion of FIG. 8a, end plate 132 is provided with passages 110c, 111c, 112c, 113c, 114c and 115c which communicate at the outer ends with respective conduits 110a, 111a, 112a, 113a, 114a and 115a of FIG. 6. The inner ends of these passages terminate at spaced points on a circular path adjacent valve plate 145. The shaded part of the upper part of FIG. 8a represents the face of valve plate 145 which engages the face of end plate 132. The part not shaded represents the recesses in the face of plate 145. A passage 117a is formed in end plate 132 to introduce sample fluid into a region adjacent valve plate 145. A vent passage 122a is likewise formed in end plate 132. These two passages are connected at their outer ends with respective conduits 117 and 122 of FIG. 6. A passage 118a is formed in end plate 132 so that the carrier gas from conduit 118 can be introduced into a region adjacent valve plate 145. A passage 123a in end plate 132 communicates at two points adjacent valve plate 145. The outer end of passage 122a communicates with conduit 123 of FIG. 6.

In the lower portion of FIG. 8a there is shown the corresponding structure of end plate 131 and valve plate 140. A plurality of passages 110d, 111d, 112d, 113d, 114d and 115d communicates between regions exterior of plate 131 and spaced points on a circular path adjacent valve plate 140. The outer ends of these passages communicate with respective conduits 110b, 111b, 112b, 113b, 114b and 115b of FIG. 1. A passage 126a communicates between a region adjacent the face of plate 131 and detector cell 127. A passage 128a extends through plate 131 and communicates at its outer edge with conduit 128 of FIG. 6. This passage also communicates with a region in plate 131 adjacent valve plate 140.

From an inspection of FIG. 8a, it can be seen that the sample material introduced through passage 117a is removed from valve 116 through passage 110c so as to be introduced into column 110 of FIG. 6. The carrier gas is introduced through passage 118a, flows through cell 119, and then through detector cell 127. The purge gas enters valve 124 through passage 125a and is removed through passages 111d, 112d, 113d, 114d and 115d. After flowing through the corresponding columns of FIG. 6, the purge gas is vented through passage 123a of valve 116.

At the end of the eight minutes previously mentioned, the valve plates are rotated counterclockwise approximately 20° to the positions shown in FIG. 8b. At the end of five additional minutes, the valve plates are rotated an additional 20° counterclockwise to the positions shown in FIG. 8c. From an inspection of these two figures it can be seen that the illustrated valve positions provide the flows previously described. An additional rotation of 20° in a counterclockwise direction results in the sample material being introduced into column 111. Each additional 60° of rotation initiates a new cycle for an adjacent column. It should thus be evident that a complete rotation of the valve plates results in the completion of one cycle of analyses by the six columns of FIG. 6.

Shaft 133 of FIG. 7 can be rotated manually to the positions described or automatically by a timing motor. Shaft 133 can carry a ratchet which is rotated 20° each time a solenoid actuated plunger is moved. This plunger can be energized at timed intervals by a cam operated switch which is actuated by a timing motor. A suitable circuit of the latter type is described in detail in M. E. Reinecke and Emmerich Guenther, Pat. No. 2,972,246.

In the analyzer of FIG. 7, the purge gas flows through the columns in a direction opposite to the direction of flow of the sample gas. Thus, it is not essential that all of the ethylene be removed prior to the following analysis because any residual ethylene is adjacent the inlet region.

It should be apparent from the foregoing description that the first zone or column operates as a frontal analysis zone or column. The adsorbent employed must be selected to have a high affinity for a major component of the sample so that the trace components first appear in the effluent. The second elution zone or column is selected to separate the trace components.

While the invention has been described in conjunction with present preferred embodiments, it should be evident that it is not limited thereto.

We claim:

1. Apparatus for chromatographic analysis of a multicomponent vapor sample which comprises column means containing material for separating components from said multicomponent vapor sample; conduit means for introducing sample vapor and carrier gas into said column means; column vent means; measuring cell means; conduit means communicating between the outlet of said column means and each of said column vent means and measuring cell means, said conduit means containing selector means for alternatively directing flow from said outlet of said column means to said measuring cell means and said column vent means; and conduit means for passing a stream of carrier gas to reference measuring cell means for measuring a property of said gas to provide a basis for comparison with the measurement obtained from a binary mixture of a component of said multicomponent vapor sample and said carrier gas passed through said measuring cell means to determine the concentration of a specific component of said multicomponent vapor sample in the binary mixture.

2. Apparatus for chromatographic analysis of a multicomponent vapor sample which comprises column means containing material for separating components from said multicomponent vapor sample; conduit means for introducing sample vapor and carrier gas into said column means; column vent means; carrier gas supply means; measuring cell means; conduit means communicating between the outlet of said column means and said column vent means, carrier gas supply means, and measuring cell means, said conduit means containing selector means for alternatively directing, at predetermined intervals, flow from said outlet of said column means to said measuring cell means and said column vent means, and for periodically directing flow from said carrier gas supply means to said measuring cell means; and conduit means for passing a stream of carrier gas to reference measuring cell means for measuring a property of said gas to provide a basis for comparison with the measurement obtained from a binary mixture of a component of said multicomponent vapor sample and said carrier gas passed through said measuring cell means to determine the concentration of a specific component of said multicomponent vapor sample in the binary mixture.

3. Apparatus for chromatographic analysis of a multicomponent fluid stream comprising, in combination, column means containing material for separating components from said multicomponent fluid stream; carrier gas supply means; column vent means; measuring cell means; first conduit means for introducing the fluid stream and a first stream from said carrier gas supply means into said column means; second conduit means communicating between an outlet of said column means, said column vent means, said carrier gas supply means and said measuring cell means, said second conduit means containing selector means for directing flow from the outlet of said column means to said measuring cell means and, alternatively, directing flow from the outlet of said column means to said column vent means; and third conduit means for passing a second stream from said carrier gas supply means to a reference cell means for measuring a property of said carrier gas to provide a basis for comparison with measurements obtained from binary mixtures of discrete components of the multicomponent fluid stream and the first stream from said carrier gas supply means directed to said measuring cell means whereby respective concentrations of specific discrete components of said multicomponent fluid stream are determined.

4. Apparatus for chromatographic analysis of a multicomponent fluid stream comprising, in combination, column means containing material for separating components from said multicomponent fluid stream; carrier gas supply means; column vent means; measuring cell means; first conduit means for introducing the fluid stream and a first stream from said carrier gas supply means into said column means; second conduit means communicating between an outlet of said column means, said column vent means, said carrier gas supply means and said measuring cell means, said second conduit means containing selector means for directing flow from the outlet of said column means to said measuring cell means and, alternatively, directing flow from the outlet of said column means to said column vent means while simultaneously directing a second stream from said carrier gas supply means to said measuring cell means; and third conduit means for passing a third stream from said carrier gas supply means to a reference cell means for measuring a property of said carrier gas to provide a basis for comparison with measurements obtained from binary mixtures of discrete components of the multicomponent fluid stream and the first stream from said carrier gas supply means directed to said measuring cell means whereby respective concentrations of specific discrete components of said multicomponent fluid stream are determined.

5. Apparatus for chromatographic analysis of a multicomponent vapor sample which comprises column means containing material for separating components from said multicomponent vapor sample; conduit means for introducing sample vapor and carrier gas into said column means; column vent means; carrier gas supply means; measuring cell means; conduit means communicating between the outlet of said column means and said column vent means, carrier gas supply means, and measuring cell means, said conduit means containing selector means for alternatively directing, at predetermined intervals, flow from said outlet of said column means to said measuring cell means and said column vent means and for periodically directing flow from said carrier gas supply means to said measuring cell means; and reference measuring cell means for measuring a property of said gas to provide a basis for comparison with the measurement obtained from a binary mixture of a component of said multicomponent vapor sample and said carrier gas passed through said measuring cell means to determine the concentration of a specific component of said multicomponent vapor sample in the binary mixture.

6. Apparatus for chromatographic analysis of a multicomponent fluid stream comprising, in combination, column means containing material for separating components from said multicomponent fluid stream; carrier gas supply means; column vent means; measuring cell means; first conduit means for introducing the fluid stream and a first stream from said carrier gas supply means into said column means; second conduit means communicating between an outlet of said column means, said column vent means, said carrier gas supply means and said measuring cell means, said second conduit means containing selector means for directing flow from the outlet of said column means to said measuring cell means and, alternatively, directing flow from the outlet of said column means to said column vent means; and a reference cell means for measuring a property of said carrier gas to provide a basis for comparison with measurements obtained from binary mixtures of discrete components of the multicomponent fluid stream and the first stream from said carrier gas supply means directed to said measuring cell means whereby respective concentrations of specific discrete components of said multicomponent fluid stream are determined.

7. Apparatus for chromatographic analysis of a multicomponent fluid stream comprising, in combination, column means containing material for separating components from said multicomponent fluid stream; carrier gas supply means; column vent means; measuring cell means; first conduit means for introducing the fluid stream and a first stream from said carrier gas supply means into said column means; second conduit means communicating between an outlet of said column means, said column vent means, said carrier gas supply means and said measuring cell means, said second conduit means containing selector means for directing flow from the outlet of said column means to said measuring cell means and, alternatively, directing flow from the outlet of said column means to said column vent means while simultaneously directing a second stream from said carrier gas supply means to said measuring cell means; and a reference cell means for measuring a property of said carrier gas to provide a basis for comparison with measurements obtained from binary mixtures of discrete components of the multicomponent fluid stream and the first stream from said carrier gas supply means directed to said measuring cell means whereby respective concentrations of specific discrete components of said multicomponent fluid stream are determined.

References Cited

UNITED STATES PATENTS 3,030,798    4/1962    Lichtenfels _____ 73—23.1

RICHARD C. QUEISSER, Primary Examiner

J. P. BEAUCHAMP, Assistant Examiner